US005576922A

United States Patent [19]

Sugaya et al.

[11] Patent Number: 5,576,922

[45] Date of Patent: Nov. 19, 1996

[54] SURGE ABSORBING STRUCTURE, SURGE ABSORBING ELEMENT, CONNECTOR AND CIRCUIT DEVICE USING THESE STRUCTURE AND ELEMENT

[75] Inventors: Yujiro Sugaya, Tochigi-ken; Michitoshi Mitani, Kanagawa-ken, both of Japan

[73] Assignee: Iriso Electronics Co., Ltd., Kawasaki, Japan

[21] Appl. No.: 377,999

[22] Filed: Jan. 25, 1995

[30] Foreign Application Priority Data

May 18, 1994 [JP] Japan .................................. 6-103875
Sep. 16, 1994 [JP] Japan .................................. 6-222271

[51] Int. Cl.[6] .................................................. H02H 1/04

[52] U.S. Cl. .......................... 361/120; 361/129; 338/34; 338/234

[58] Field of Search .................................. 361/117, 118, 361/119, 120, 126, 127, 128, 129, 130; 338/34, 36, 57, 234

[56] References Cited

U.S. PATENT DOCUMENTS 3,259,780 7/1966 Stetson .................................. 361/128
4,726,991 2/1988 Hyatt et al. .......................... 428/329
4,977,357 12/1990 Shrier ...................................... 338/21

FOREIGN PATENT DOCUMENTS 52-26060 9/1993 Japan .............................. H01T 1/14
52-68725 10/1993 Japan .............................. H02H 9/04
8906859 7/1989 WIPO .............................. H01C 7/10

*Primary Examiner*—Jeffrey A. Gaffin
*Assistant Examiner*—Michael J. Sherry
*Attorney, Agent, or Firm*—Michael D. Bednarek; Kilpatrick & Cody

[57] ABSTRACT

A surge absorbing structure capable of effectively utilizing the gaseous discharge is intended without a complicated structural configuration such as using the conventional discharge tube. To implement this, a porous layer 1 is formed by a non-conductive material to provide many holes, and sandwiched between a pair of electrodes 2*a* and 2*b* to allow the electrodes to be conducted by the gaseous discharge generated through the holes 3 in this porous layer to execute surge absorption.

13 Claims, 4 Drawing Sheets

SURGE ABSORBING STRUCTURE, SURGE ABSORBING ELEMENT, CONNECTOR AND CIRCUIT DEVICE USING THESE STRUCTURE AND ELEMENT

TECHNICAL FIELD

The present invention relates to a technique for protecting electronic circuits and the like by absorbing surge caused by static electricity and others.

BACKGROUND ART

With regard to the surge protection for electronic circuits, there is known a structure using gaseous discharging, that is, a structure which enables the utilization of a phenomenon that conduction is made when the dielectric breakdown takes place in the gaseous layer in a fine discharging gap arranged between a pair of electrodes causing discharge.

In general, a discharge voltage of gaseous discharging is the function of a product PL of a pressure P of a gas which carries discharge, and a width L of a discharging gap. Therefore, if the discharging gap is wider than a specific width, the discharge voltage rises corresponding to the width of the discharging gap (Paschen's law). Then, in the air of one normal atmosphere, the discharge voltage is minimum when a gap between the electrodes is 7.5 μm. The voltage is approximately 330 V. This voltage is usable for the surge protection of a general electronic circuit. In other words, it is logically possible to implement a surge protection by the provision of a structure in which a discharging gap is arranged in the air layer of a specific width. Actually, however, it is almost impossible to stably maintain an extremely narrow gap of 7.5 μm between the electrodes at all times.

Therefore, in order to use the gaseous discharge for the surge protection, there has been employed a structure which uses a discharge tube. This discharge tube is airtightly formed to make it possible to obtain a practical discharge voltage even in a discharging gap of several hundred μm by filling a discharge gas in it to reduce the minimum breakdown voltage (as disclosed in Japanese Unexamined Patent Publication No. 5-268725 and Japanese Unexamined Patent Publication No. 5-226060, for example). As a result, the structure of a surge absorbing element prepared by use of the discharge tube tends to make the structure complicated, and at the same time, make its size bulky and its configuration inflexible. Further, an element of the kind cannot be of any other types than a single type. Consequently, there is a need for the provision of the element for each of the signal lines which must be protected, hence leading to the need for the circuit device to be made bulky and complicated, and also, to the significant increase of cost. Also, it is necessary to provide a comparatively wide space for installing each of the elements. Particularly, in order to implement the surge protection in the connector stage, the implementation becomes more difficult because of the limited availability of space. There are many more instances that may bring about restricted use of an element of this kind.

SUMMARY OF THE INVENTION

In consideration of the technical background described above, the present invention has been accomplished and, it is an object of the invention to provide a surge absorbing structure whereby the gaseous discharge can be effectively utilized without employing any complicated structural arrangement such as the use of the conventional discharge tube. Also, it is another object of the invention to provide a surge absorbing element which uses the aforesaid surge absorbing structure. Further, it is still another object of the invention to provide the connector and circuit device which use these structure and element.

According to the present invention, a surge absorbing structure is such that a porous layer formed by a non-conductive material having many holes is placed between a pair of electrodes facing each other at a given interval, and that the surge absorption is executed by allowing the electrodes to be conductive by the gaseous discharge created through the holes of this porous layer.

FIG. 1 is a view schematically illustrating this surge absorbing structure, in which the porous layer 1 is formed to be in contact with a pair of electrodes 2*a* and 2*b*, respectively. The holes 3 in the porous layer provide each of individual air layers for creating gaseous discharge. Discharging in each of the holes 3 generates conduction, and each of the discharges in the holes 3 is accompanied by the surface creepage along the wall 3*w* of each hole 3, thus making it possible to significantly reduce the discharge voltage compared to the case where a gap is merely arranged for creating discharge. In other words, the provision of the sandwiched porous layer results in a reduction of the discharge voltage in the gaseous discharge in the air, thus enabling an expansion of the surge absorbing area. Also, in this surge absorbing structure, the discharging gap can be set by use of the porous layer whose thickness is easily controlled as described above. Consequently, the gap can be set highly precisely and stably.

It is also possible to form the porous layer provided in such surge absorbing structure by many methods of various kinds, such as a method for precipitating $SiO_2$ layer by electrolytic precipitation or the like on the surface of metallic material used as one of the electrodes; a method for growing a non-conductive thin layer on the surface of metallic material used for one of the electrodes by use of PVD such as sputtering or ion plating; a method for using an aluminum material for one of the electrodes and growing a film of $\gamma$-$Al_2O_3$ on the surface of the aluminum material by anode oxidation; a method for bonding to one of the electrodes the grains whose diameter corresponds to the desired thickness of the porous layer using an adhesive; and a method for forming the layer using the sheets having many numbers of through holes finely made by a laser processing or the like. The porous layer thus prepared is provided with many numbers of through holes whose diameter is in the μm order, and is formed in a thickness of several to several ten μm in general. However, it is easy to control the thickness of the porous layer.

Since this surge absorbing structure provides conduction by the discharge through the holes in the porous layer as described above, it is fundamentally necessary to arrange the holes to penetrate the porous layer across the electrodes. As shown in FIG. 2, however, the end portion of each hole 3 can be filled by a conductive material 4 to an appropriate depth. This arrangement is essentially the same as the one where the holes pass through the layer across the electrodes, and enables the utilization of the above-mentioned principle of conduction in the surge absorbing structure in the same way. Then, if a material such as carbon which is highly resistant to melting is used as the conductive material for filling in the end portion of each hole, the phenomenon of short circuit accompanying the fusion of electrode can be prevented, thus obtaining more desirable conditions in this respect.

The holes are filled with such conductive material by utilizing a high-pressure vapor sealing used for the so-called alumite processing if the porous layer is formed by the film of γ-$Al_2O_3$ described above. More specifically, if a high-pressure vapor sealing is given to the film of γ-$Al_2O_3$, there is a resultant development of γ-$Al_2O_3.H_2O$ on the upper end of each hole from the inner wall surface to the inner side. Consequently, each hole is filled by the conductive γ-$Al_2O_3.H_2O$.

With regard to this prevention of the phenomenon of short circuit by use of the conductive material filled in the holes, the description will be made again later.

Now, the porous layer in this surge absorbing structure may also be formed by a material having non-linear resistive properties such as SiC besides an insulator in a narrow sense. When a material having the non-linear resistive properties is used, an arrangement should be made so that the solid portion surrounding each of the holes is allowed to absorb the primary surge by the application of the non-linear resistive properties, and then, the secondary surge absorption can be conducted by the discharge through the holes when the current exceeds the allowable quantity and causes the resistance of the solid portion to increase. In other words, it is possible to enhance the function of the surge protection by the combination of the non-linear resistive properties in the solid portion of the porous layer and the discharge through the holes.

For the surge absorbing element to be used for the above-mentioned surge absorbing structure, not only it is possible to form the element by adhesively bonding the porous layer to one of the electrodes by the various methods described above, out also possible to arrange a structure in which the other electrode is laminated on the other surface of the porous layer as required. Particularly, therefore, when a surge absorbing element is prepared by adhesively bonding the porous layer to one of the electrodes, it is possible to form the element in such a manner that a thin metallic sheet is used as the electrode, for example, and that after the porous layer is formed on its surface, the metallic sheet is cut in a desired size and shape to produce the element. The structure of such a surge absorbing element is extremely simple, and remarkably flexible with respect to the size and configuration, not to mention its excellent workability. For example, it is easy to form the element in a thin and elongated strip so that a plurality of signal lines can be protected at a time. Also, being considerably flexible, the element can be installed extremely easily. Further, it is possible to form the porous layer on the terminal of the connector itself which functions as one of the electrodes. In this case, the terminal of the connector itself becomes a surge absorbing element, hence making it possible to significantly simplify assembling the terminal with the connector.

When using the above-mentioned surge absorbing structure or the surge absorbing element for the connector, it is of course possible to incorporate a separately formed surge absorbing element in addition to that the porous layer is formed on the terminal of the connector itself to make it a surge absorbing element as described above. Also, it is possible to form and incorporate the porous layer on the grounding electrode of the connector as in the case of the terminal. To form the porous layer on the grounding electrode, a structure can be arranged to provide the porous layer on both surfaces of the ground electrode, and then, to allow the terminal to abut upon each of the surfaces of the porous layer as the other electrode. In this ease, two sets of surge absorbing structures are formed in a state of sharing the grounding electrode as one of the paired electrodes.

Also, in order to use the above-mentioned surge absorbing structure or the surge absorbing element for a circuit device such as a printed circuit board, it may be possible to incorporate the surge absorbing element which is prepared separately as in the case of the connector or to incorporate it by forming the porous layer directly on the grounding electrode of the circuit device by means of an adhesive bonding. In the latter case, it is possible to adopt a type in which the grounding element can be shared by two sets of surge absorbing structures as in the ease of the connector.

Further, as described above, the surge absorbing structure or surge absorbing element of the present invention can take a mode given below. That is, a conductive material having a high-melting point is adhesively bonded to the porous layer adhesively formed on one of the electrodes in such a manner that the material is at least provided to prevent a molten substance of the electrode from entering into the holes, and is bonded dispersedly corresponding to the contact areas of the other electrode.

In this way, it is possible to prevent the molten substance of the electrode from entering into the holes by use of a material having a high-melting point, thus effectively avoiding the phenomenon of short circuit resulting from the molten electrode. In other words, the electrode on the surge generating side or the plating given to the electrode is molten by discharge, and when a molten substance of the kind enters the holes and invites the phenomenon of short circuit, the surge absorbing structure or surge absorbing element is caused by this phenomenon to make its function unstable. With the arrangement described above, it is possible to avoid this condition, and provide the surge absorbing structure or surge absorbing element of the present invention with more stabilized operating characteristics.

There is a need for the material having a high-melting point to be bonded discretely corresponding to the contact areas of the other electrode as described above. If the material having a high-melting point is bonded all over the surface, it can hardly maintain insulation between adjacent electrodes themselves when a plurality of electrodes on the surge generating side should be controlled collectively, as a matter of course. The discrete bonding can be conducted by use of a pattern in accordance with the distribution patterns of the circuit device or connector in which the surge absorbing element is incorporated. A pattern of the kind is usually a striped pattern or block pattern.

A typical conductive material having a high-melting point is carbon black. Besides, a ceramic conductor such as silicon carbide is suitably used.

The typical mode of bonding the material having a high-melting point is such that the layer thereof is formed on the surface of the porous layer in a specific thickness. Aside from this, however, it may be possible to adopt a sealing mode as described above with reference to FIG. 2 in which the material 4 having a high-melting point is adhesively filled in the end portion of the holes 3 to an appropriate depth.

To form the layer of the material having a high-melting point, the simplest method would be a coating. That is, the powdered material having a high-melting point is mixed with a binder using a synthetic resin having a high thermal resistance, thus preparing a coating agent containing the material having a high-melting point suitably used for this coating method. Also, in order to effectuate the adhesive sealing, a coating agent which contains the same material having a high-melting point as the one used for the layer formation is filled in or a method is adopted so that a squeegee is applied after the sealing is once formed in the layer configuration. Further, for example, it may be possible to fill in the coating agent of solid type. As the binder to be prepared as a coating agent, it is more preferable to use a conductive synthetic resin, but a non-conductive synthetic resin should be adoptable if only the mixing ratio of the conductive material having a high-melting point is sufficiently high so that the coating agent containing the material having a high-melting point itself is made conductive.

Also, a mode of forming a moistureproof film on the porous layer is preferably adoptable for the surge absorbing structure or surge absorbing element of the present invention. The porous layer tends to absorb moisture because of its porous nature, and it becomes difficult in some cases to maintain the estimated value of resistance under a high humid condition. If such a case is encountered, the surge absorbing structure or surge absorbing element is caused to make its function unstable. This is the reason why the formation of the moistureproof film is preferable.

The moistureproof film is to prevent the moisture from adsorbing to the porous layer. Therefore, as far as the coating agent containing the material having a high-melting point is prepared to function for the prevention of moisture sufficiently, it is good enough if only the moistureproof film is formed on the portions other than the contact areas of the other electrode, that is, the portions where the material having a high-melting point are adhesively bonded.

However, if the function of the moisture prevention is not sufficiently given to the coating agent containing the material having a high-melting point, it is preferable to from the moistureproof film over the contact areas of the electrode, too. In this ease, the moistureproof film is formed to cover the entire surface including the contact area of the electrode at first, and then, the film covering the contact areas of the electrode is processed to make the gaseous discharge possible. To do this processing, a discharge is given once in the contact areas of the electrode at a voltage higher than the specific value to melt the moistureproof film accordingly in the positions corresponding to the holes in the porous layer in each of the contact areas of the electrode. In this way, the holes are formed on the moistureproof film through to the holes of the porous layer. The moistureproof function required for a moistureproof film of the kind is usually provided satisfactorily by a coating material made of a generally used synthetic resin.

With this structure, it is possible to prevent the moisture effectively from being absorbed to the porous layer by the provision of the moistureproof film or by the combination of the moistureproof film and the coating agent containing the material having a high-melting point, and to maintain the set value of resistance stably even in a high humid condition.

BEST MODE FOR CARRYING OUT THE INVENTION

Hereinafter, the embodiments will be described according to the present invention. In this respect, the drawings referred to in the description given below represent the respective constituents of the surge absorbing element exaggeratingly with respect to the sizes thereof in order to make them easily understandable. The actual shapes of the constituents are not necessarily represented by the drawings.

In the present embodiment, an aluminum material is used for one of the electrodes, and on the surface thereof, a porous layer is formed by precipitating an $SiO_2$ layer by a method of electrolytic precipitation. An aluminum sheet of 300 μm thick is used, and then, the film of $SiO_2$ whose porous rate is approximately 40% is formed in a thickness of 10 μm. The discharge voltage of the surge absorbing element thus obtained is approximately 200 V. The voltage clamping velocity is approximately 5 nanoseconds. Also, the surge absorbing element according to the present embodiment is highly flexible and easily bent. It is highly resistant to a bending through 90° or more.

Figure 1:
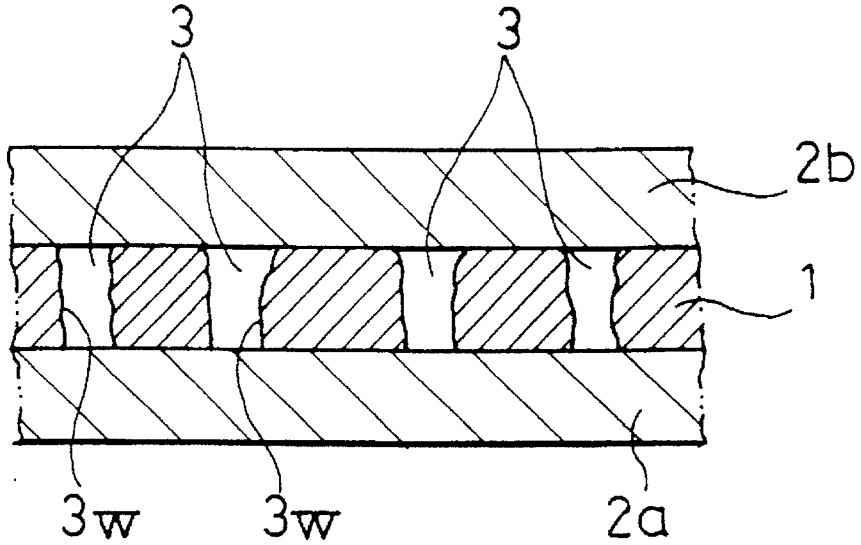
FIG. 1 is a view schematically showing a surge absorbing structure according to the present invention.
Figure 2:
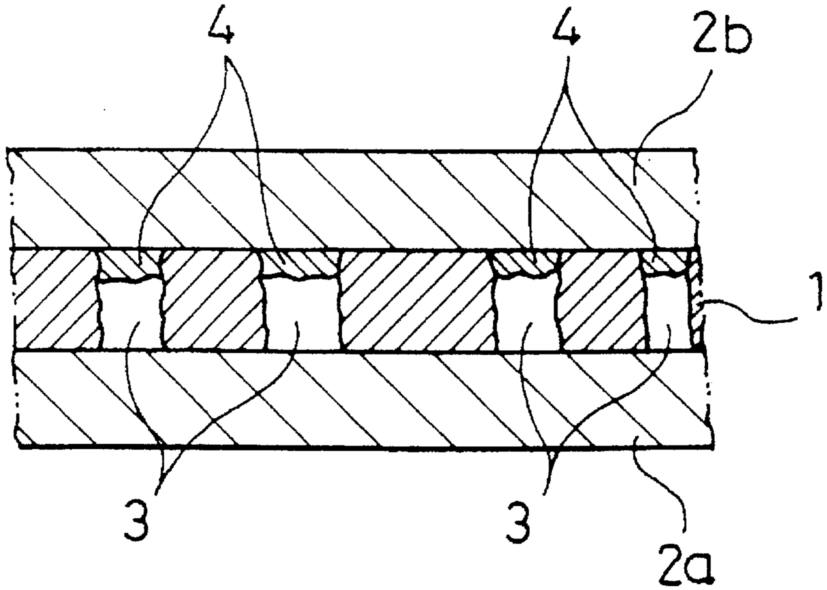
FIG. 2 is a view schematically showing another example of the surge absorbing structure according to the present invention.
Figure 3:
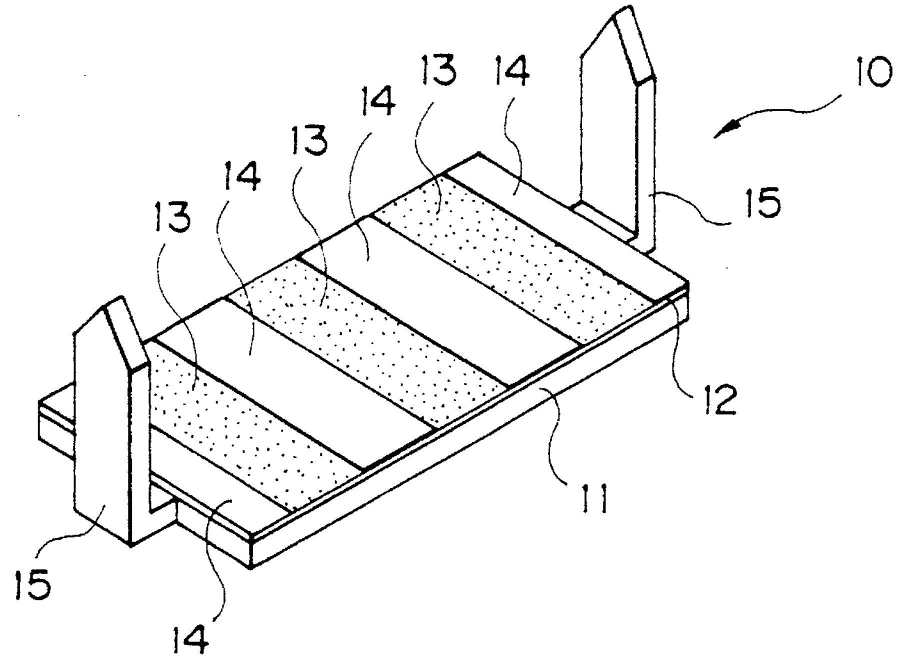
FIG. 3 is a perspective view showing a surge absorbing element according to an embodiment of the present invention.
Figure 4:
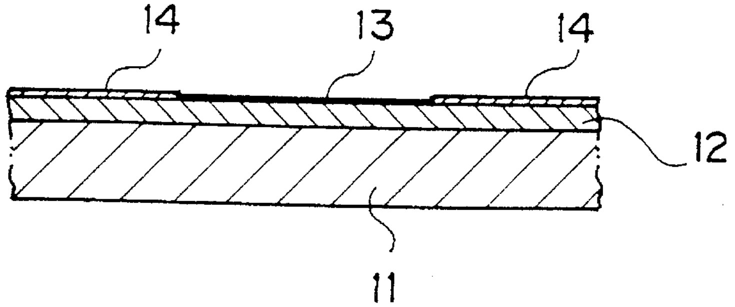
FIG. 4 is a partially enlarged cross-sectional view of the surge absorbing element shown in FIG. 3.

The surge absorbing element 10 shown in FIG. 3 exemplifies a mode in which the element produced in the above-mentioned conditions is assembled with a base board. On the base electrode 11 which functions as one of the electrodes, a porous layer 12 is adhesively bonded. On the surface of the porous layer 12, the contact area 13 and non-contact area 14 are set alternatingly at a given width in a striped pattern. The contact area 13 is coated with a coating agent in which carbon black, a conductive material having a high-melting point is mixed with a resin binder having a high thermal resistance, while the non-contact area 14 is coated with an acrylic resin coating agent as a moistureproof film (see FIG. 4).

Figure 5:
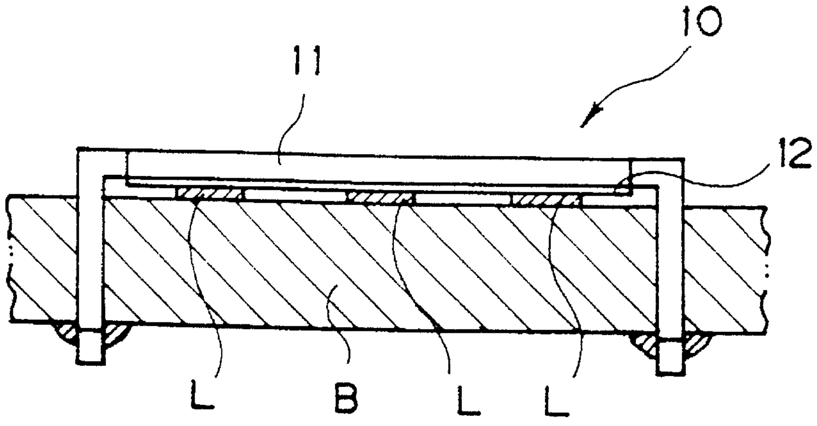
FIG. 5 is a cross-sectional view showing a state where the surge absorbing element show in FIG. 3 is installed on a base.

To install this surge absorption element 10 on a circuit board, the porous layer 12 is positioned to be in contact with the signal lines L of the board B which function as the other electrode as shown in FIG. 5, and then, the element is fixed to the board B by the extended legs 15 of the base electrode 11.

Figure 6:
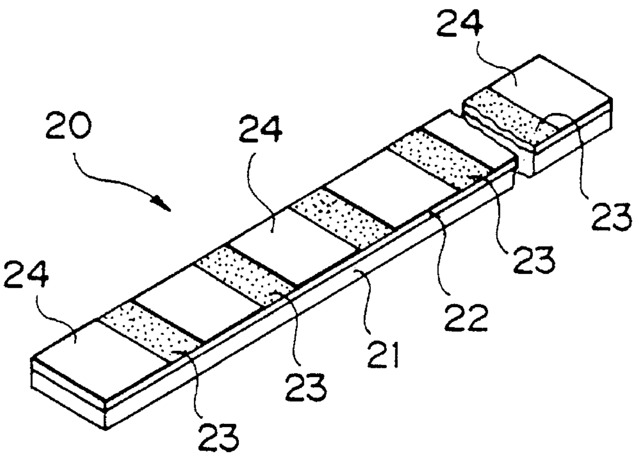
FIG. 6 is a perspective view showing a surge absorbing element according to another embodiment of the present invention.

FIG. 6 illustrates an example of the surge absorbing element 20 which is formed in an elongated flat configuration. On the base electrode 21 made of an aluminum material, the $SiO_2$ layer is adhesively formed as the porous layer 22 by a method of electrolytic precipitation in the same manner as above. On the surface of the porous layer 22, the contact area 23 and non-contact area 24 are set in a striped pattern in the same way as the above-mentioned embodiment.

Figure 7:
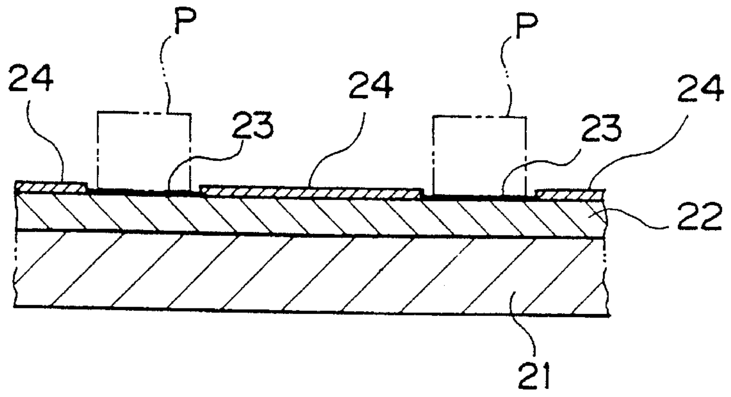
FIG. 7 is a partially enlarged cross-sectional view of the surge absorbing element shown in FIG. 6.

This surge absorbing element 20 is suitably used for a connector of a multiple pin type or the like. As shown in FIG. 7, for example, this element is used by allowing each contacts P of the connector to abut upon the contact areas 23 while making the base electrode 21 a grounding line for surge absorption.

Figure 8:
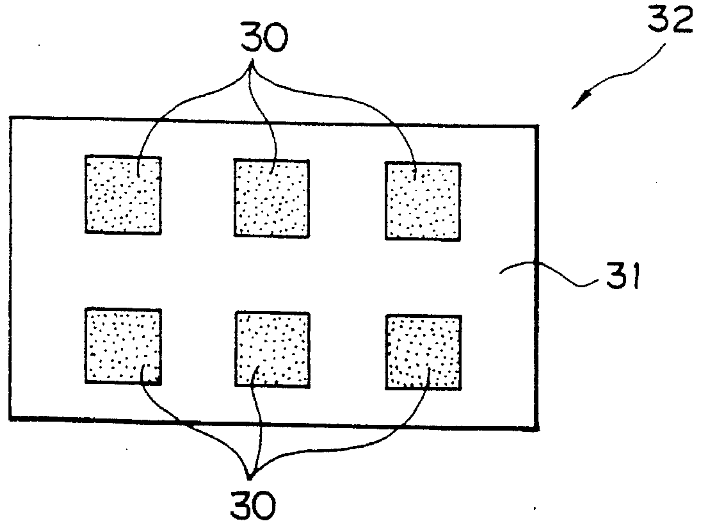
FIG. 8 is a plan view showing a surge absorbing element according to still another embodiment of the present invention.

FIG. 8 illustrates an example of the surge absorbing element 32 whose contact areas 30 and non-contact areas 31 are arranged in a block pattern.

Figure 9:
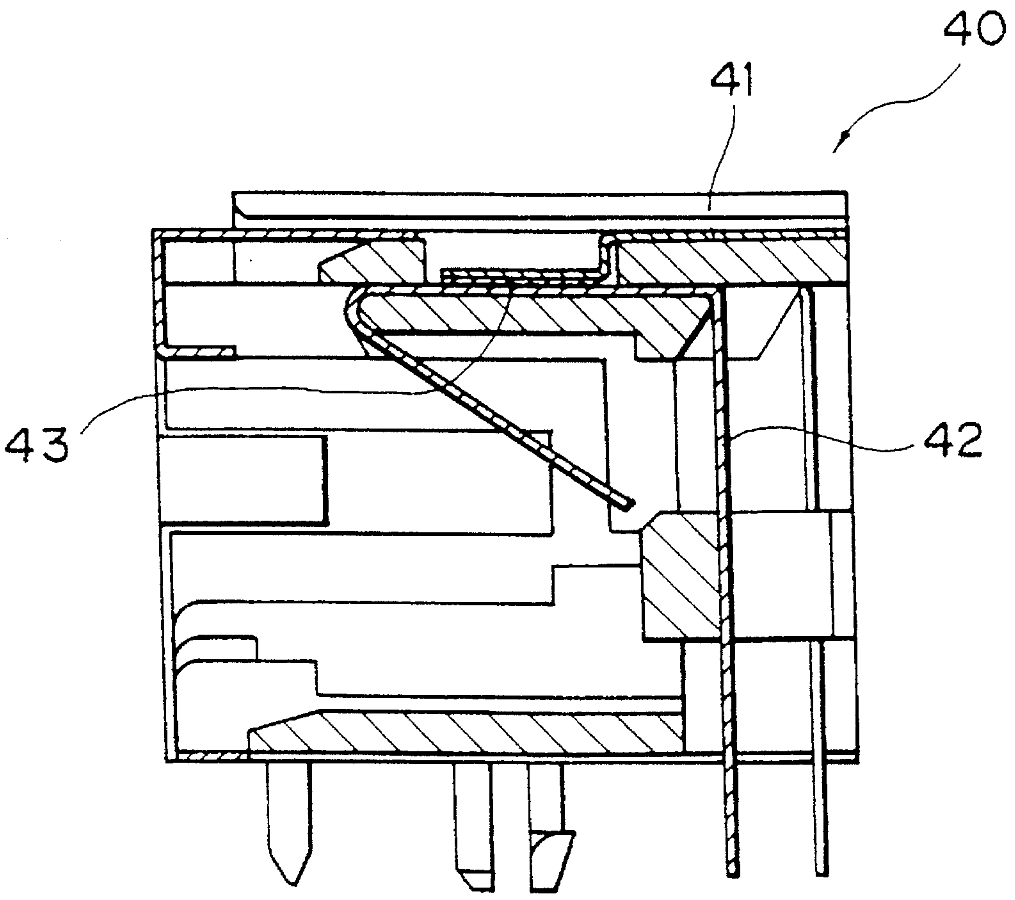
FIG. 9 is a cross-sectional view showing a modular connector using the surge absorbing element according to the present invention.

FIG. 9 illustrates an example of the modular connector 40 in which the surge absorbing structure of the present invention is incorporated. The structure of the connector itself is well known. The arrangement is made to enclose the porous layer 43 between a shell member 41 functioning as one of the electrodes and the terminal 42 functioning as the other electrode. It is possible to arrange this structure by partially forming the porous layer 43 integrally with the shell member 41 or by forming the porous layer 43 integrally with the terminal 42 or also, by preparing the surge absorbing element separately from the shell member 41 and the terminal 42, and incorporating the element thus prepared for the formation.

INDUSTRIAL APPLICABILITY

As described above, according to the surge absorbing structure of the present invention, a porous layer is sandwiched between a pair of electrodes, and an arrangement is made to generate gaseous discharge through many numbers of holes in the porous layer, hence making it possible to significantly simplify the structure of a surge absorbing element, to provide a considerable freedom with respect to the configuration and size of the surge absorbing element, and further, to provide a conspicuous flexibility for the surge absorbing element. As a result, by use of the surge absorbing structure and surge absorbing element of the present invention, it is possible to protect a plurality of signal lines collectively, and at the same time, to install the element to a connector easily, not to mention the installation on the circuit. In this way, the application range can be expanded for the surge protection.

What is claimed is:

1. A surge absorbing structure, comprising:

a pair of electrodes facing each other; and a porous layer formed by a nonconductive material and having many holes, the porous layer being sandwiched between the pair of electrodes such that the structure executes surge absorption by allowing the electrodes to be conducted by electric discharge generated through the holes in the porous layer.

2. The surge absorbing structure according to claim 1, wherein the porous layer is adhesively bonded to one of the electrodes.

3. The surge absorbing structure according to claim 1, wherein a conductive material having a high-melting point is adhesively bonded to said porous layer such that at least a molten substance of one of the electrodes is prevented from entering the holes.

4. The surge absorbing structure according to claim 1, further comprising a moistureproof film.

5. The surge absorbing structure of claim 1, wherein the structure is used in a connector.

6. The surge absorbing structure of claim 2, wherein the structure is installed in a connector.

7. The surge absorbing structure of claim 3, wherein the structure is installed in a connector.

8. The surge absorbing structure of claim 1, wherein the structure is used in a circuit device.

9. The surge absorbing structure of claim 2, wherein the structure is installed on a circuit device.

10. The surge absorbing structure of claim 3, wherein the structure is installed on a circuit device.

11. A surge absorbing element for use with a surge absorbing structure having a pair of electrodes facing each other and a porous layer, the porous layer being formed by a nonconductive material and having many holes, the porous layer being sandwiched between the pair of electrodes such that the structure executes surge absorption by allowing the electrodes to be conducted by gaseous discharge generated through the holes in the porous layer, the surge absorbing element comprising:

one of the electrodes having the porous layer adhesively bonded thereto.

12. The surge absorbing element of claim 11, further comprising a conductive material having a high-melting point adhesively bonded to the porous layer such that at least a molten substance of the electrode can be prevented from entering the holes of the porous layer.

13. The surge absorbing element of claim 12, further comprising a moistureproof film.

* * * * *